(No Model.) 5 Sheets—Sheet 1.

J. F. DURYEA.
MOTOR CARRIAGE.

No. 586,084. Patented July 6, 1897.

Witnesses:
J. D. Garfield
H. I. Clemons

Inventor,
James Frank Duryea
by Chapin & Co.
Attorneys (No Model.)　　　　　　　　　　　　　　　　5 Sheets—Sheet 2.
J. F. DURYEA.
MOTOR CARRIAGE.

No. 586,084.　　　　　　　　　　　Patented July 6, 1897.

Witnesses:
J. D. Garfield
K. I. Clemons

Inventor
James Frank Duryea,
by Chapin & Co.
Attorneys (No Model.) 5 Sheets—Sheet 4.

J. F. DURYEA.
MOTOR CARRIAGE.

No. 586,084. Patented July 6, 1897.

Witnesses.
J. W. Garfield,
K. I. Clemons

Inventor.
James Frank Duryea,
by Chapin & Co
Attorneys.

(No Model.)

J. F. DURYEA.
MOTOR CARRIAGE.

No. 586,084.

5 Sheets—Sheet 5.

Patented July 6, 1897.

Witnesses:
J. A. Garfield
E. E. Rice

Inventor,
James Frank Duryea,
by Chapin & Co
Attorneys.

UNITED STATES PATENT OFFICE.

JAMES FRANK DURYEA, OF SPRINGFIELD, MASSACHUSETTS, ASSIGNOR TO THE DURYEA MOTOR WAGON COMPANY, OF SAME PLACE.

MOTOR-CARRIAGE.

SPECIFICATION forming part of Letters Patent No. 586,084, dated July 6, 1897.

Application filed May 11, 1896. Serial No. 591,068. (No model.)

*To all whom it may concern:*

Be it known that I, JAMES FRANK DURYEA, a citizen of the United States of America, residing at Springfield, in the county of Hampden and State of Massachusetts, have invented new and useful Improvements in Motor-Carriages, of which the following is a specification.

This invention relates to driving mechanism for automobile vehicles, and has for its object the improvement in means for controlling and varying the speed of vehicles of this class in which belting is used for the transmission of power from the motor to the driving-shaft thereof; and the invention consists, essentially, in the construction and arrangement for shifting said driving-belts, all as hereinafter fully described and claimed.

Figure 1:
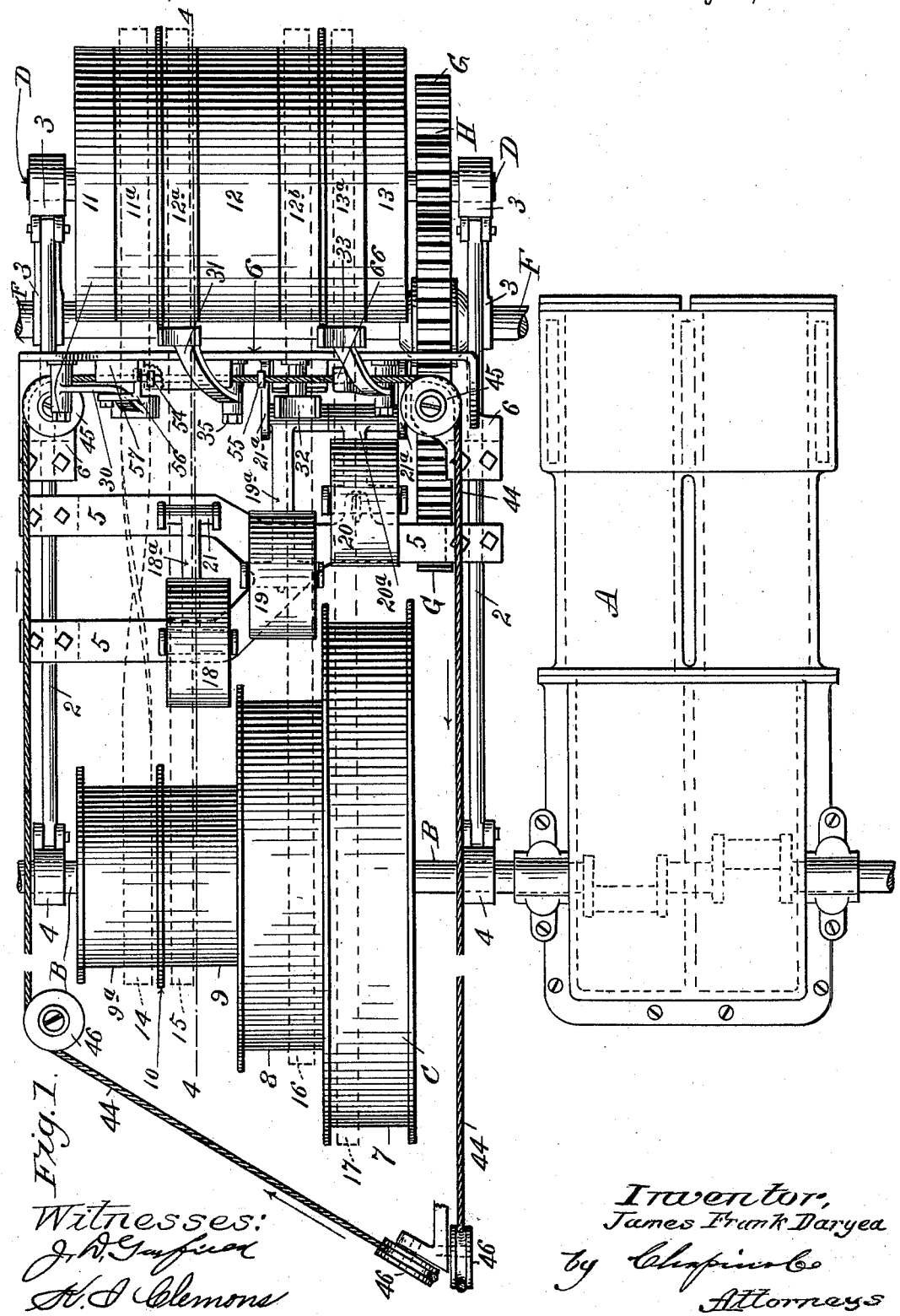
Figure 2:
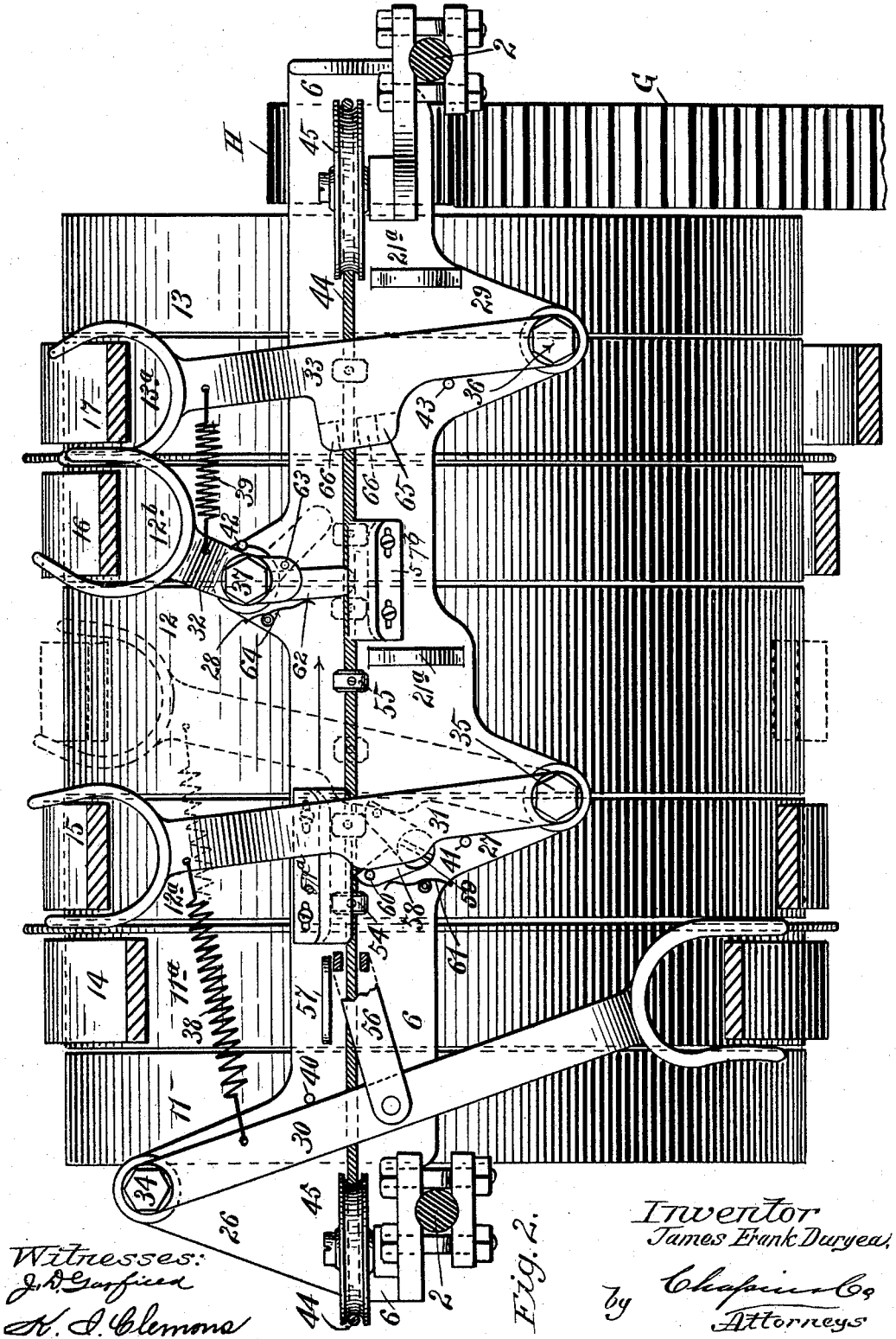
Figure 3:
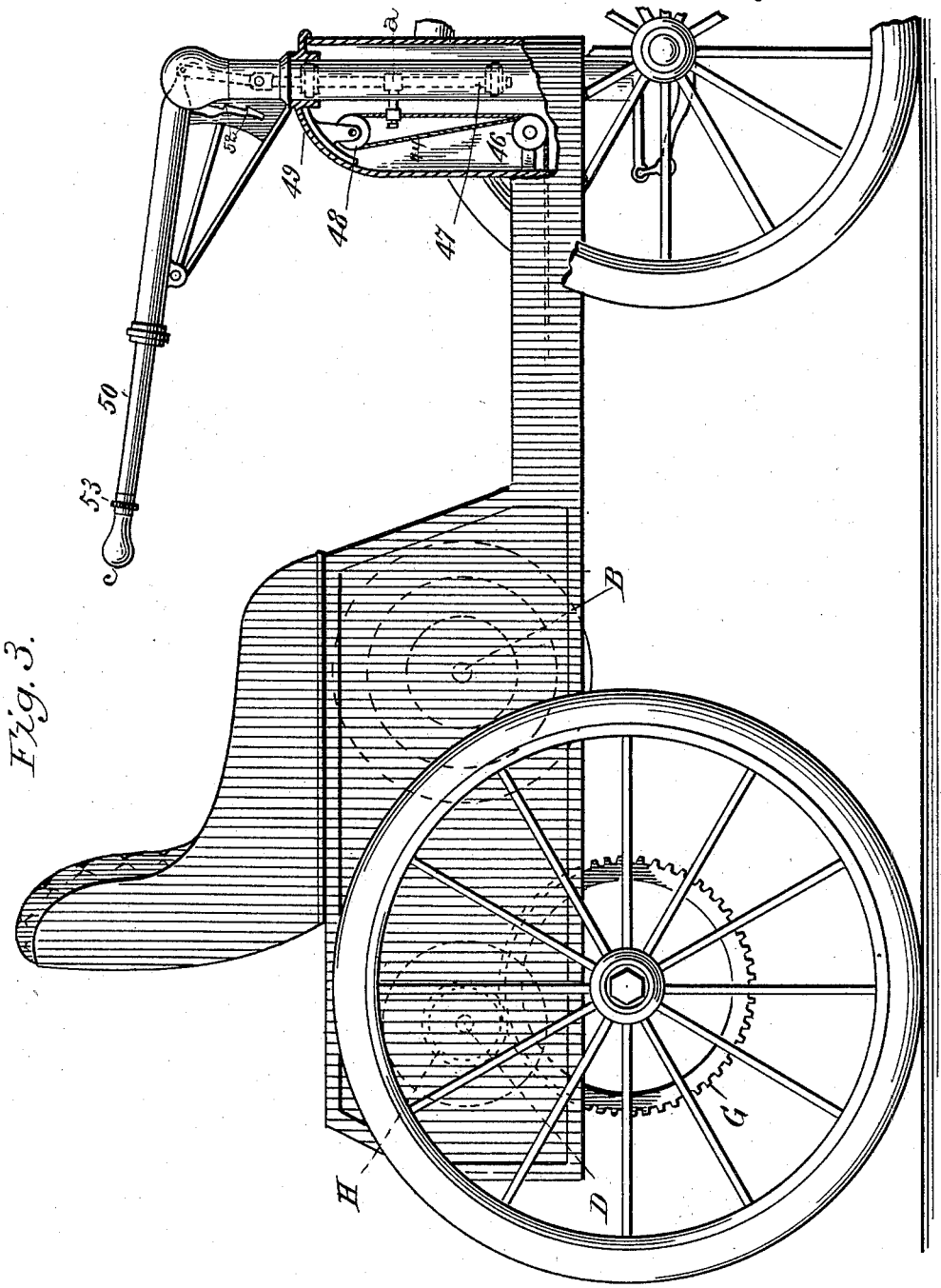
Figure 4:
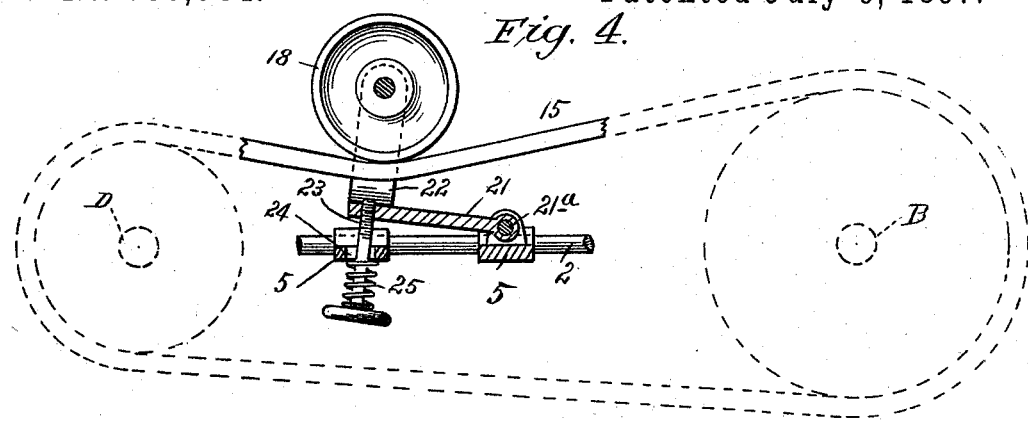
Figure 5:
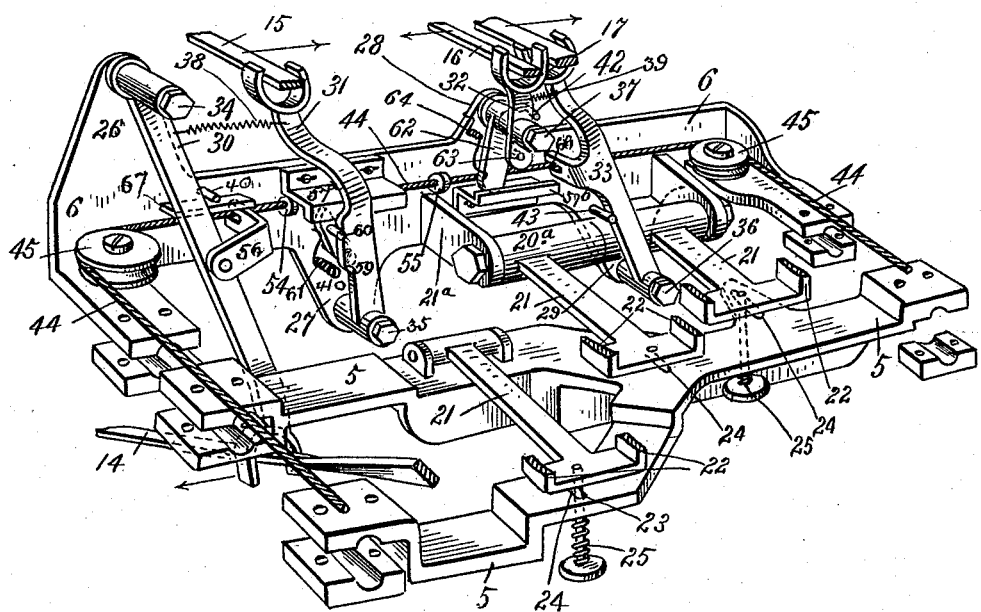
Figure 6:
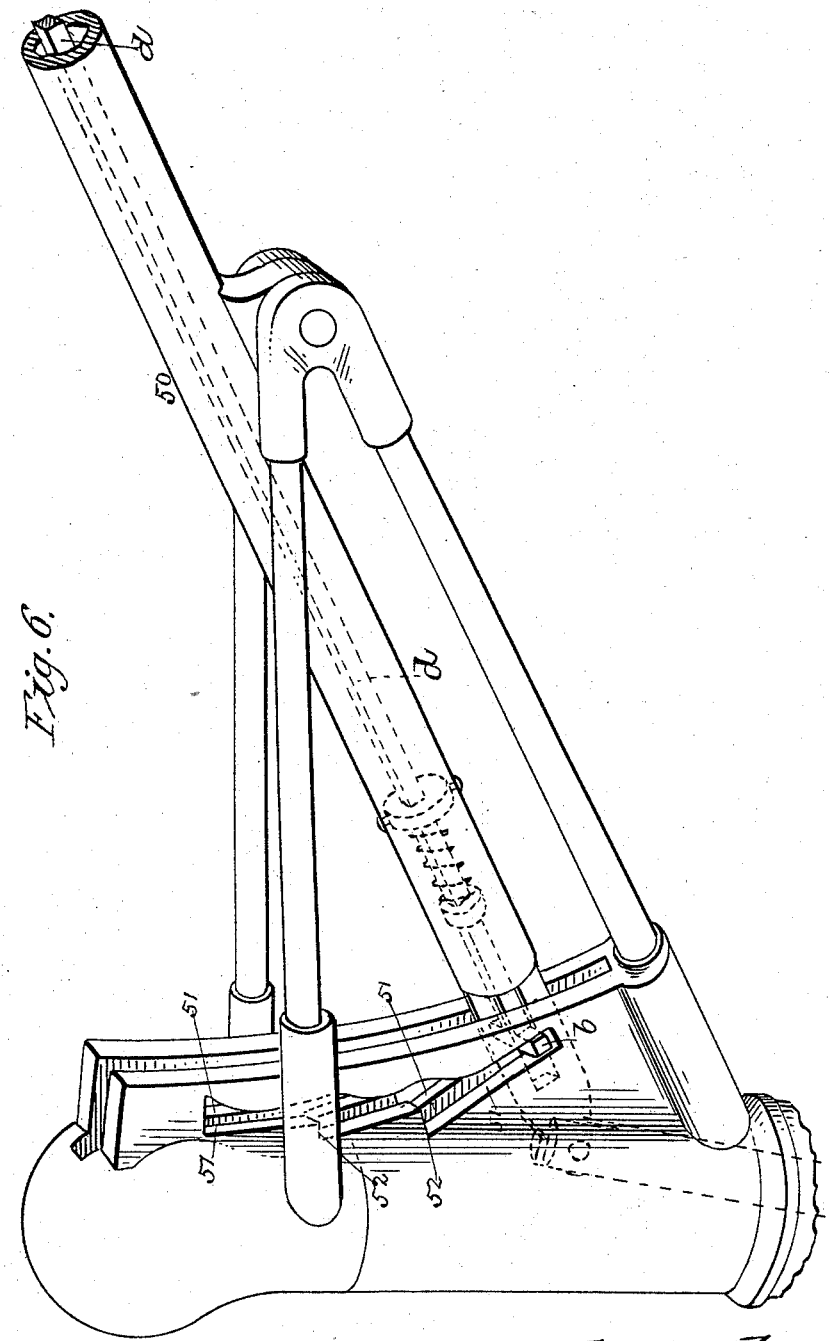

In the drawings forming part of this specification, Figure 1 is a plan view of an incased motor, its main shaft and cone-pulley thereon, and a counter-shaft and the belt-shifting mechanism between said shafts, and a portion of a driving axle or shaft of the vehicle. Fig. 2 is an enlarged view of the counter-shaft, looking at it from a position between it and the main shaft of the motor. Fig. 3 is a side elevation of an automobile carriage, showing the position in the body thereof of the said main shaft and said counter-shaft, connections between the counter-shaft and the driving-axle of said carriage, and means in the steering-head thereof for actuating the belt-shifting devices. Fig. 4 is a side elevation, partly in dotted lines, of an idler-pulley as applied to a belt between the main and counter shafts, said view being on line 4 4, Fig. 1. Fig. 5 is a perspective view of the belt-shifting mechanism in its frame, but removed from the vehicle, a portion of the frames of the idler-pulleys being broken away. Fig. 6 is an enlarged perspective of the steering-head and its attachments.

In the drawings the above-described improvements are shown as applied to a carriage, though said improvements are equally applicable to launches or other means of conveyance.

In the drawings, A represents the motor; B, its main or crank shaft; C, the cone-pulley fixed on said shaft; D, the counter-shaft, having a series of tight and loose pulleys fixed on said shaft; F, the driving shaft or axle of the vehicle, and G and H the gear and pinion, respectively, on said axle F and shaft D. The said motor and its shaft are suitably supported in the body of the vehicle. Said counter-shaft D is suitably supported from the driving-axle F for always maintaining in operative relation the gear G on said axle and the pinion H on the said counter-shaft. Two rods 2 2 extend from the ends of said counter-shaft to the main shaft B. The ends of said rods are pivotally connected to two lugs on the top of the arms 3 3, supporting said counter-shaft, and a similar pivotal connection of the opposite ends of said rods is made with two collars 4 4 on said main shaft. Said collars 4 and the bearings on the end of said arms 3, in which the counter-shaft revolves, may be provided with ball-bearings, if desired. Two frames 5 and 6 for supporting the idler-pulley frames and belt-shifting mechanism are placed transversely between the said shafts B and D and are clamped by bolts, as shown, or otherwise secured rigidly to said rods 2. These frames are clearly illustrated in Fig. 5. The said frame 6, as shown in Figs. 1, 2, and 5, supports all of the belt-shifters, and the said frame 5 supports one of the idlers entirely and the two others partially.

To obtain the desired variations in the speed of the counter-shaft D, the cone-pulley C is made with the varying diameters 7, 8, and 9, the part 9 being divided into two parts 9 and $9^a$ by the annular flange 10 thereon, and the other spaces 7 and 8 being suitably flanged to prevent the belts from running off from their faces.

On the counter-shaft D tight and loose pulleys are provided. Said tight pulleys are indicated by 11, 12, and 13, and said loose pulleys are indicated by $11^a$, $12^a$, $12^b$, and $13^a$. Space $9^a$ has located opposite its face the pulleys 11 and $11^a$. Said space 9 has located opposite its face the pulley $12^a$ and one-half of the pulley 12. Space 8 has located opposite its face one-half of pulley 12 and pulley $12^b$, and space 7 has located opposite its face the pulleys 13 and 13ᵃ. Said cone-pulley on main shaft B and said tight and loose pulleys on counter-shaft D are provided with four belts (see Figs. 1 and 2)—viz., 14, 15, 16, and 17. Said belt 14 is a crossed belt and serves only when the counter-shaft is to be driven in a direction contrary to that given to it by the belts 15, 16, and 17. In the drawings the belts are all shown on their loose pulleys, the position of belt 15 on tight pulley 12 being indicated in dotted lines in Fig. 2.

Belts 15, 16, and 17 are provided with idler-pulleys 18, 19, and 20, whereby suitable tension may be maintained on said belts. Said idler-pulleys are made of substantially the same width as the face of the spaces 7, 8, and 9 on the cone-pulley—viz., a width equal, substantially, to the surface occupied by one of said belts on both tight and loose pulleys. Said idler-pulleys are supported on frames 18ᵃ, 19ᵃ, and 20ᵃ, which are pivotally secured by one end to the frames 5 and 6. Said frames consist, as shown in Fig. 4, of a long base 21, hinged at one end to the frames 5 and 6 at 21ᵃ and having on their free ends the arms 22 at right angles to said base, and between said arms is hung, on a suitable arbor, the said idler-pulleys, the said belts running between said arms 22 in contact with the under side of said pulleys. The said free ends thereof have screwed therein the rods 23. Said rods 23 pass through slightly-elongated slots 24 in the said frame 5 and have suitable heads thereon. Between said heads and the under side of said frame 5 is a spiral spring 25, and by screwing the rod 23 into or out of said frame, thereby compressing said spring or relieving the tension thereof, more or less tension is applied to the upper side of the belts, according to the work demanded of them.

That part of the frame 6 parallel with counter-shaft D and connecting the two sides, which are clamped to the rods 2 2, lies in a vertical position relative to said two sides, and several extensions 26 27 28 29 of its edges are provided, to which the shipper-levers 30, 31, 32, and 33 are pivotally connected, as shown in Fig. 2.

The shipping-lever 30, engaging the belt 14, which is the crossed belt, is hung on the upwardly-extended part 26 of the frame 6 by a bolt 34, with the forked end of said lever 30 engaging with the lower side of the said belt, which is its driving side. Shipping-levers 31 and 33 are hung on the downwardly-extended parts 27 and 29 of the frame 6 by bolts 35 and 36, and the shipping-lever 32 is hung on the upwardly-extended part 28 of frame 6 by a bolt 37. Said shipping-levers 30 and 31 are connected to each other by a spring 38, and the shipping-levers 32 and 33 are similarly connected together by spring 39. Each of said levers 30, 31, 32, and 33 is moved singly and consecutively by mechanism which will be described farther on, and as each of them moves in a direction opposite to that of the lever with which it is connected by the said springs 38 and 39 it is apparent that while one of said levers is being operated by said lever-operating mechanism it moves against the tension of one of said springs, and as each of said shipping-levers is provided with a stop-pin, as 40, 41, 42, and 43, each lever in turn offers a rigid point of resistance to the action of one of said springs when the lever with which it is connected is moved to shift a belt from the loose to the tight pulley. The purpose of the said springs 38 and 39 is to ship the belt from the tight to the loose pulleys, and as will be more fully set forth farther on.

The said belt-shipping mechanism above referred to, by which the said belt-shipping levers are operated, is constructed as follows: An endless wire rope 44 is suitably supported on the frame 6 by the grooved pulleys 45 in such position as to permit that part of it between said pulleys to move in a horizontal plane in proximity to and parallel with that part of the frame 6 lying next to the faces of the tight and loose pulleys on the counter-shaft D. Other suitably-placed grooved pulleys 46 on the frame of the vehicle guide the said wire rope to a point near the base of the steering-head 47 and from thence upwardly to and around the grooved pulley 48, secured to the steering-head frame 49. A clamp a fixed on said steering-head secures thereto one of the two parts of said rope parallel therewith, whereby vertical movements imparted to said steering-head by its operating-lever 50 imparts to said rope a corresponding degree of movement. The direction of movement thereof, shown by the arrows near said rope, indicates the direction in which it is moved to shift said belts from their loose to their tight pulleys. In Fig. 3 the position of said operating-lever 50 is that in which it would be with the vehicle at its highest speed. A spring-actuated cross-head b engages with the slot 51, having the notches 52 therein, each of the said notches corresponding to certain speed of the vehicle. Therefore in depressing the handle end of said lever 50, to bring it to the position shown in the above-named figure, the said cross-head moving in said slot will engage with said notches 52 in said slot and remain in engagement therewith until the ferrule 53 on said lever 50 has been operated by the driver of the vehicle to withdraw said cross-head from such engagement and permit the handle of the operating-lever to be still farther depressed. The ferrule 53 and handle c are secured to the outer end of the spring-actuated rod d, which has the cross-head b secured to its inner end. The operator has only to operate the ferrule to disengage the cross-head from any one of the shoulders 52 and then press downward on the outer end of the lever 50 and the position of the lever will be changed from the position shown in Fig. 6 to that shown in Fig. 3. To change the lever from the position shown in Fig. 3 to that shown in Fig. 6, the outer end of the lever 50 has but to be raised and the cross-head will slide down the inclined edges of the slot 51. This explanation is given to show that each notch of the slot 51 is engaged by mechanism in the operating-lever coincidently with the shifting of a certain belt from its loose to its tight pulley, and said belt will remain on said tight pulley as long as said lever 50 is held fixed by engagement of a part thereof with a notch in slot 51.

The construction of the steering-gear and means for controlling lever 50 herein shown form part of an application for United States Letters Patent, filed by me on March 6, 1896, Serial No. 582,102, to which reference is made for fuller description thereof.

Said wire rope 44 is shown in Figs. 1 and 2 in its normal position—that is, with all the belts on their loose pulleys. The various shipping-levers 30, 31, 32, and 33 are provided with means of engagement with metal buttons 54 and 55, suitably secured on the rope. Said button 54 operates shipping-levers 30 and 31 and said button 55 operates shipping-levers 32 and 33, lever 30 being operated by a movement of button 54 to the left (see Fig. 2) and lever 31 by a movement thereof to the right. Said levers 32 and 33 are moved also by a movement to the right of button 55, and means are provided, as will be described farther on, for permitting said buttons to pass under the ends of levers 31 and 32 in one direction without imparting movement thereto.

The above-named means of engagement between the said shipping-levers and said buttons are provided as follows: On shipping-lever 30 (see Fig. 2) an arm 56 is rigidly secured, and its free end is bent rearwardly and bifurcated, as shown, the wire rope 44 passing between the two members of said bifurcated portion. When said button 54 is carried by the rope 44 to the left, Fig. 2, said button comes in contact with said bifurcated end of arm 56 on the lever 30, (the lower end of which is forked to receive said belt 14,) and moving said lever to the left ships the said belt from its loose pulley 11$^a$ to its tight pulley 11, said lever 30 moving against the tension of spring 38, the end of which is secured to the shipping-lever 31, which is rigidly held against movement in the same direction as lever 30 by pin 41, fixed in the frame 6. As said wire rope 44 is more or less flexible and as the arm on lever 30 stands at an angle relative to the line of movement of said rope the tendency thereof is to spring upward as soon as force is applied thereto to move said lever 30, and to provide against said upward tendency thereof a rib 57 is fixed to the frame 6 and extends out from the face thereof parallel with said rope and just far enough above it to permit the button 54 to pass under it, to the end that it may hold said rope to practically a horizontal line of movement regardless of the amount of power required to be exerted thereon to move said shipping-lever. When said belt 14 is to be shipped again onto its loose pulley 11$^a$, the wire rope is given a proper direction by a movement of the operating-lever 50 (see Fig. 3) and said button 54 is moved back to the position shown in Fig. 2 and spring 38 retracts said lever 30 and forces said belt over onto the said loose pulley.

When it is desired to ship belt 15 from its loose pulley 12$^a$ to its tight pulley 12, it is moved in a direction contrary to the movement just described as given to the shipping-lever 30—viz, it is moved to the right (see Fig. 2)—its shipping-lever 31 being secured on the extended part 27 of frame 6. A short lever 58, having a vibratory movement on the bolt 59, screwed into frame 6, has a pin 60, projecting at right angles outwardly therefrom and normally held in contact with the edge of the said shipping-lever 31, as shown in said Fig. 2, by a spring 61, secured to said frame 6, one end of which spring bears against one end of said lever 58. When said wire rope 44, carrying the button 54, moves to the right, it encounters the end of said lever 58, which is moved thereby from its position shown in full lines in said Fig. 2 to that indicated in dotted lines, at which point the movement of lever 31 is arrested and held stationary by the stopping of the said rope 44 in such position that the button 54 is left over the end of said lever 58, the movement of the rope being arrested by the engagement of the operating-lever 50, Fig. 3, with one of the notches 52 in the slot 51 of the steering-head. A guide-plate 57$^a$ is secured to the face of the frame 6 in a position directly over the said lever 58, said plate projecting outwardly from said frame to a point beyond the outer edge of the button 54 and then turning downward, forming thereby a downwardly-flanged guide-plate to hold the rope 44 to a horizontal line of movement when the button 54 is engaged with the top of the lever 58 to throw shipping-lever 31 over to the position shown in dotted lines in Fig. 2. A similar guide-plate 57$^b$ is provided for the button 55 when it is in engagement with the lever 62, by which the shipping-lever 32 is operated. Belt 16 runs from the counter-shaft pulley 12 and 12$^b$ to a larger diameter 8 of the cone-pulley C, and if it is desired to still more increase the speed of the counter-shaft D the said operating-lever 50 is disengaged from its said restraining-notch 52 and the handle end thereof depressed still farther, whereby additional movement to the right is given to said rope 44, and the button 54 passes on over the top of said lever 58, releasing the shipping-lever 31, which, by its spring 38, is again returned to its normal position, (shown in Fig. 2,) and returning lever 58 to the position thereof shown in full lines in said figure.

The first movement of the rope 44 to operate the shipping-lever 31 by the button 54 carries the button 55 on said rope to the first position thereof (shown in dotted lines)—viz., in close contact with the end of the lever 62, which operates shipping-lever 32—and therefore the second or continued movement of the rope 44 to the right above mentioned moves the downwardly-projecting end of the lever 62 with it and as far as is indicated by the position thereof in dotted lines. It is there arrested and held by the engagement, as aforesaid, of the forward end of the operating-lever 50 with one of the notches 52 of the slot 51 of the steering-head, the shipping-lever 31 having, as above described, been returned to its normal position by its spring 38. The operation of the button 55 to throw the said lever 32 differs somewhat from the operation of the lever 31, as follows: A short lever 62 is pivotally secured on the bolt 37, on which the shipping-lever 32 has a swinging movement, as described, and is located between said lever 32 and the face of the frame 6. A part of said lever 32 extends below the bolt 37 and has fixed therein a pin 63, which projects rearwardly therefrom and close to the edge of said lever 62. A spring 64, secured to the frame 6, bears on the side of lever 62 and holds the latter normally in contact with said pin 63. Therefore as said button 55 moves said lever 62 the latter, bearing on pin 63, moves said lever 32, as above described. When said lever 32 is operated to move its belt 16 from pulley $12^b$ to pulley 12—that is, from the loose to the tight pulley—it does so against the action of the spring 39, which connects said levers 32 and 33, and as said levers move in opposite directions and as they each come to a stop against their pins 42 and 43, respectively, when their belts 16 and 17 are on the loose pulleys $12^b$ and $13^a$ it follows that each of them in turn acts as a fixed point against which the spring 39 may act when said spring is brought into operation by the movement of one of said levers 32 or 33. Belt 17 runs from the counter-shaft pulleys 13 and $13^a$ to the largest diameter 7 of cone-pulley C, and after said lever 32 has been shipped onto its tight pulley 12 and it is desired to still more increase the speed of the counter-shaft D the wire rope 44 is moved still farther to the right, Fig. 2, and the button 55 on said rope moves out from under the end of the lever 62 of the shipping-lever 32, which is immediately operated upon by the contraction of spring 39, which returns it to its normal position, and thereby ships belt 16 back again onto its loose pulley $12^b$. Meanwhile said button 55, carried by the rope 44, comes in contact with the edge of the lever 33, pivotally secured to the extension 29 of frame 6 by the bolt 36, and moves it far enough to ship the belt 17 to the tight pulley 13 from its loose pulley $13^a$. When said belt 17 is on the tight pulley 13, the position of the button 55 is about that shown in dotted lines back of said lever 33 in Fig. 2. Said shipping-lever 33 is made with an enlargement 65 on its side, on the back side of which are two rearwardly-projecting arms 66, (shown in dotted lines in Fig. 2,) between which the rope 44 passes, the purpose of said arms being to hold said rope 44, which is more or less flexible, as aforesaid, to a practically horizontal line of movement. When said button 55 has been carried to the position indicated by dotted lines back of the lever 33, it has reached the limit of its movement, and the position of the operating-lever 50, coinciding with the said position of the button 55, is that shown in Fig. 3—viz., with the handle end thereof depressed to its lowest point. In this position the belt 17 is on the tight pulley 13, which is opposite the largest diameter 7 of the cone-pulley C, and the highest speed of the counter-shaft D is attained. From this last-named position of the button 55 and lever 33 one continuous movement of the handle end of the operating-lever 50 in an upward direction will operate, first, to cause the belt 17 by its spring 39 to be shipped onto the loose pulley $13^a$. Next the button 55 will encounter the short lever 62, pivoted on the bolt 37, and swing it on its said pivot without imparting any motion to the shipping-lever 32, the movement of said lever 62 being against the action of its spring 64. The button 54 will then encounter the short lever 58, which will swing on its pivot 59 without imparting any movement to the shipping-lever 31. The two buttons 54 and 55 will then be in the position shown in Fig. 2 in full lines, and a still further upward movement of the operating-lever 50 will cause said button 54 to operate shipping-lever 30 and impart to the counter-shaft D a motion contrary to that given to it by said belts 15, 16, and 17 and drive the carriage or other conveyance backward. Thus it is seen that at any time while the carriage is moving forward at any rate of speed from the lowest to the highest that by a continuous upward movement of the handle end of the operating-lever 50 the then operating driving-belt may be instantly shipped onto its loose pulley and the pulley 11 be given a reverse motion by the belt 14 and the carriage or other conveyance be driven at full speed in a reverse direction. The said operating-lever 50 can be moved unobstructedly to reduce the speed or to reverse it, but increase in speed must normally be given step by step, because of the engagement with the notches 52 of the forward end of the said operating-lever 50.

Having thus described my invention, what I claim, and desire to secure by Letters Patent, is—

1. In an automobile carriage or other conveyance, a driving cone-pulley, a driven counter-shaft having a plurality of tight and loose pulleys thereon, a plurality of straight belts, and one crossed belt engaging said driving and said driven pulleys, and means for moving said belts singly and consecutively from said loose to said tight pulleys, and automatic means for singly and consecutively moving each of said belts back onto its loose pulley, and suitable connections between a motor and said driving cone-pulley, and between said counter-shaft and the driving axle or shaft of the conveyance, substantially as set forth.

2. In an automobile carriage or other conveyance, a driving cone-pulley, a driven counter-shaft having a plurality of tight and loose pulleys thereon, a plurality of straight belts and one crossed belt engaging said driving and said driven pulleys, and means for moving said belts singly and consecutively from said loose to said tight pulleys, and automatic means for singly and consecutively moving each of said belts back onto its loose pulley, and an adjustable idler-pulley for each of said straight belts, and suitable connections between a motor and said driving cone-pulley and between said counter-shaft and the driving axle or shaft of the conveyance, substantially as set forth.

3. In an automobile carriage or other conveyance, a driving cone-pulley, a driven counter-shaft having a plurality of tight and loose pulleys thereon, a plurality of straight belts and one crossed belt engaging said driving and said driven pulleys, and a plurality of shipping-levers pivotally supported between said driving-cone and said counter-shaft pulleys, and means for imparting to each of said shipping-levers, consecutively, a swinging movement in one direction against the action of a retracting-spring, and suitable connections between a motor and said driving-cone, and between said counter-shaft and the driving axle or shaft of said conveyance, substantially as set forth.

4. In an automobile carriage or other conveyance, a driving cone-pulley, a driven counter-shaft having a plurality of tight and loose pulleys thereon, a plurality of straight belts and one crossed belt engaging said driving and said driven pulleys, and a plurality of shipping-levers pivotally supported between said driving-cone and said counter-shaft pulleys, and means for imparting to each of said shipping-levers, consecutively, a swinging movement in one direction against the action of a retracting-spring, said means consisting of a member moving in proximity to the said shipping-levers and substantially at right angles thereto, and engaging consecutively with each of them, and means for imparting movement to said moving member, and connections between a motor and said driving-cone, and between said counter-shaft and the driving axle or shaft of a carriage or other conveyance, substantially as set forth.

5. In an automobile carriage or other conveyance, a driving cone-pulley and a driven counter-shaft having a tight pulley on said counter-shaft, and a loose pulley on each side of said tight pulley, suitable belts engaging said driving and driven pulleys, two shipping-levers pivotally supported for movement in a vertical plane, and in engagement with said belts, and a member moving in a line substantially at right angles to said shipping-levers, and engaging them at a point vertically between the pivotal points thereof for moving said belts singly from said loose pulleys to said tight pulley, and suitable connections between a motor and said driving-pulley and between said counter-shaft and the driving-axle of said carriage or other conveyance, substantially as described.

6. In an automobile carriage or other conveyance, a driving cone-pulley, a driven counter-shaft having a plurality of tight and loose pulleys thereon, a plurality of straight belts and one crossed belt engaging said driving and said driven pulleys, and a plurality of shipping-levers pivotally supported between said driving-cone and said counter-shaft pulleys, and means for imparting to each of said shipping-levers, consecutively, a swinging movement in one direction against the action of a retracting-spring, said means consisting of a suitably-supported wire rope one portion of which lies in proximity to said shipping-levers, and having movements in a line substantially at right angles thereto, said portion having means thereon for engagement with said levers, and an operating-lever, as 50, with which said wire rope is connected, and by which said movements are imparted thereto, combined with suitable connections between said cone-pulley and a motor and between said counter-shaft and the driving axle or shaft of the carriage or other conveyance, substantially as described.

7. In an automobile carriage or other conveyance, a driving cone-pulley, a driven counter-shaft having a plurality of tight and loose pulleys thereon, a plurality of straight belts and one crossed belt engaging said driving and said driven pulleys, and a plurality of shipping-levers pivotally supported between said driving-cone and said counter-shaft pulleys, alternately above and below the line of movement of a member moving in a line substantially at right angles to said shipping-levers, an operating-lever, as 50, for imparting said movement to said member, and suitable connections between a motor and said driving cone-pulley and between said counter-shaft and the axle or shaft of a carriage or other conveyance, substantially as described.

8. In an automobile carriage or other conveyance, a motor, a driving-shaft and a counter-shaft, belts engaging pulleys on said shafts, and means for moving said belts in a line with the axes of said shafts, consisting of the shipping-levers 30, 31, 32, and 33, the wire rope 44, the operating-lever 50, and the buttons 54 and 55, on said wire rope, for moving said shipping-levers in one direction, and the springs 38 and 39, for moving said levers in a reverse direction, and the fixed guide-plates 57, 57ª, and 57ᵇ, substantially as described.

9. In the herein-described belt-shipping mechanism, a tight pulley, a loose pulley on each side thereof, and having belts thereon engaged by shipping-levers pivotally supported respectively above and below the line of movement of the wire rope 44, having the buttons 54 and 55, thereon, for imparting movement to said shipping-levers by the engagement of said buttons with the levers 58 and 62, fixed to the frame 6, and the fixed guide-plates 57, 57ª, and 57ᵇ, for said rope 44, substantially as described.

JAMES FRANK DURYEA.

Witnesses:
JOHN FRUCHEES,
JOHN J. CLANCY.